United States Patent [19]

Frank

[11] Patent Number: 5,018,084
[45] Date of Patent: May 21, 1991

[54] DARKROOM CALCULATOR

[76] Inventor: Steven J. Frank, 99 Pond Ave., Brookline, Mass. 02146

[21] Appl. No.: 303,639

[22] Filed: Jan. 30, 1989

[51] Int. Cl.$^5$ .......................... G03B 7/00; G06F 9/00
[52] U.S. Cl. .............................. 364/525; 364/705.01; 364/706
[58] Field of Search ............. 364/525, 571.01, 705.01, 364/706, 200, 900; 354/289.1, 105, 297, 307; 324/157

[56] References Cited

U.S. PATENT DOCUMENTS

| | | | |
|---|---|---|---|
| 3,611,159 | 10/1971 | Florsheim et al. | 364/525 |
| 4,104,510 | 8/1978 | Miyashiro | 235/64.7 |
| 4,120,038 | 10/1978 | Stieringer | 364/705 |
| 4,297,011 | 10/1981 | Adams, Jr. | 354/23 S |
| 4,449,805 | 5/1984 | Sakurada et al. | 354/105 |
| 4,492,916 | 1/1985 | Johnson | 324/157 |
| 4,598,986 | 7/1986 | Shiratori et al. | 354/289.1 |
| 4,639,113 | 1/1987 | Ohkubo | 354/289.1 |
| 4,649,510 | 3/1987 | Schmidt | 364/900 |
| 4,692,005 | 9/1987 | Takami | 354/289.1 |
| 4,742,369 | 5/1988 | Ishii et al. | 354/289.1 |
| 4,809,198 | 2/1989 | Terashita | 364/525 |
| 4,855,779 | 8/1989 | Ishikawa et al. | 354/289.1 |

Primary Examiner—Parshotam S. Lall
Assistant Examiner—Ellis B. Ramirez
Attorney, Agent, or Firm—Nutter, McClennen & Fish

[57] ABSTRACT

A darkroom calculator that performs mass, volume, concentration and temperature conversions useful in the preparation of darkroom chemicals; calculation of proper development times and temperatures for exposed film; calculation of proper dilution temperatures; calculation of exposure values relevant to the enlargement process and exposure of sensitized substrates; and monitoring of the passage of time and solution temperature levels.

19 Claims, 2 Drawing Sheets

DARKROOM CALCULATOR

BACKGROUND OF THE INVENTION

A. Field of the Invention

The invention relates to the field of photographic computing devices, and in particular to devices for performing calculations useful in connection with darkroom procedures.

B. Prior Art

The primary component of any photographic system is a camera, which is used to record images on light-sensitive film contained therein. A typical camera comprises a body seal to block the entry of light therein except through a lens mounted on the front face of the body. Inside the body is a film holder assembly that is arranged to expose the film, a section at a time, to the light that enters the body through the lens. The entry of light through the lens into the body is controlled by shutter and diaphragm assemblies mounted in the body behind the lens. The shutter is designed to remain open only for a set, selected period of time. The diaphragm permits light to enter only through a set, selected portion of the diameter of the lens. In still cameras, the aperture is typically opened by a manually operated shutter release button, while cameras used for recording motion pictures contain automated shutter assemblies.

When light that is radiated and reflected from objects within the camera's field of view strikes the photosensitive emulsion of the film, the chemical characteristics of the emulsion are slightly altered in response thereto; the degree of alteration is a function of the intensity of the impinging light and the physico-chemical characteristics of the emulsion. The exposed film thus retains a "latent" image of the scene that appeared in the camera's field of view when the shutter was open.

The latent image must be amplified chemically and made permanent before it can be viewed. Slide film is developed directly into a positive image and thus emerges from processing in a completed state. Print film, on the other hand, yields a negative tonal image that must be reversed in order to render the recorded scene accurately. Typically, the image is reproduced on larger, light-sensitive substrates for viewing.

Darkroom photography consists of those procedures necessary to transform exposed film into finished prints or slides. Such procedures may be highly automated, as in the case of commercial film and slide processing, or performed manually to obtain especially high levels of quality or artistic control, or to produce special effects.

Darkroom procedures may be loosely organized into several categories: (1) film processing, which consists of subjecting the exposed film to chemicals that transform the latent image into a visible image and make this image permanent (the tonal rendition will be negative in the case of print film, and positive in the case of slide film); (2) print enlargement, wherein the negative is placed in an enlargement device that magnifies the image present on the negative and projects it onto a sensitized substrate (usually, but not always, light-sensitive photographic printing paper), thus producing a positive image; (3) print processing which, like film processing, involves subjecting the substrate exposed by the enlarger to chemicals that amplify the latent image produced by enlargement exposure so as to render it visible and permanent on the substrate; and (4) post-development processes, such as toning or archival processing, which produce further chemical and/or physical changes in the developed print to enhance appearance, permanence or other features of interest to the photographer.

Non-automated darkroom procedures call for mixing various solutions and performing a number of specialized procedures in a specified order. These procedures must be carried out in total darkness (where color processing or exposed but undeveloped black-and-white film is involved), under a "safelight" (which will not expose, and is therefore "safe," with respect to black-and-white print emulsions) or, least often, under ordinary lighting. Critical to successful completion of these procedures is strict control of parameters such as solution concentration, timing, temperature levels, and exposure.

Because of the limited life of photographic chemicals, darkroom photographers must constantly prepare fresh batches of solutions. This requires careful measurement of solid and liquid components. Although pre-mixed chemical concentrates typically require no more than addition of water, only the most popular formulas are obtainable in packaged form. Often, for reasons of economy or because of unavailability of pre-mixed chemicals, photographers consult published (or original) formulas and purchase the appropriate reagents in bulk. Such formulas frequently appear in exotic measurement units, which may differ from those of readily available measuring equipment or prove cumbersome to relate to other pertinent formulas.

Darkroom photographers must also contend with rather precise temperature requirements for various solutions. Stock solutions are typically stored and must be mixed at room temperature, often resulting in guesswork with respect to the temperature of a diluent such as water that may be heated or cooled easily. Even when the target temperature is reached, constant vigilance must often be maintained to prevent the solution from becoming hotter or colder, or at least to alter processing in response.

The film development process is particularly sensitive to changes in temperature. Because development temperature and proper development time are related to one another, it is possible to adjust the duration of processing rather than attempt to alter the temperature of the solution. The relationship between temperature and time is somewhat complex, however, and the necessary computations cannot be performed conveniently, particularly in a darkroom environment.

The enlargement process, like ordinary photography, presents the practitioner with several exposure parameters that are variable on a continuous or nearly continuous basis. Darkroom photographers usually settle on a single set of exposure parameters to produce an acceptable print by making "test strips," wherein different segments of photographic printing paper are exposed for different intervals of time or at different apertures in order to produce a selection of possible exposures. However, the exposure thus chosen will change if the photographer varies the aperture of the enlarger lens, the duration of exposure, raises or lowers the enlarger head, or inserts filters. Often, the photographer must produce another set of test strips for each parameter variation.

Very few photographic computational aids appear in the prior art, and even fewer pertain directly to darkroom photography. U.S. Pat. No. 4,498,140 discloses an electronic device for controlling the exposure of film to the various lights or lamps conventionally used in certain graphic arts processes. U.S. Pat. No. 4,120,038 describes an electronic calculator intended for use as a component of a flash unit, which computes a single dedicated variable (aperture) from flash and film sensitivity data only. U.S. Pat. No. 4,297,011 sets forth a system for calculating aperture and distance values dictated by an electronic flash, which system is integrated into the flash unit, and also displays the values so calculated.

DESCRIPTION OF THE INVENTION

A. Brief Summary of the Invention

The invention provides means for performing mass, volume, concentration and temperature conversions necessary to preparation of darkroom chemicals; calculating proper development times and temperatures for exposed films; calculating proper dilution temperature; calculating exposure values relevant to the enlargement process and exposure of sensitized substrates; and monitoring the passage of time and temperature level.

Conversion functions performed by the invention relate to mass or weight (hereinafter referred to as mass/weight for brevity), volume and concentration units. Available mass/weight units include pounds (lb), ounces (oz), grains (Gr), kilograms (kg) and grams (g). Liquid volume can be expressed in gallons (gal), quarts (qt), fluid ounces (fl. oz), liters (l), milliliters (ml), teaspoons (tsp) and tablespoons (tbp). For mass/weight or volume, the user enters the quantity by pressing keys corresponding to the appropriate numerical values, followed by the key corresponding to the initial unit type, and finally the key representing the desired unit type. Available concentration units include pounds/gallon, pounds/quart, ounces/gallon, ounces/quart, ounces/fluid ounce, grains/gallon, grains/quart, grains/fluid ounce, grains/liter, grains/milliliter, kilograms/gallon, kilograms/quart, grams/gallon, grams/quart, grams/fluid ounce, grams/liter and grams/milliliter. To enter a concentration value, the user first presses keys corresponding to the appropriate numerical value followed by the key sequence representing the initial concentration unit type (mass/weight unit key, then the [PER] key and finally the volume unit key) and thereafter presses the key sequence representing the desired concentration unit type.

The invention also assists with mixing of chemical solutions in a manner that permits achievement or maintenance of a desired target temperature for the working solution, regardless of ambient room temperature. The user enters the desired working temperature, the existing temperature of the stock solution, the necessary volume of water and the ultimate total mixed volume; the invention returns the necessary temperature of the water diluent, which is readily set by the user. In addition, the invention permits instant conversions between Fahrenheit and Celsius temperature units.

Proper development time for use of a particular film developer may be obtained from the development number, which is provided by the manufacturer of the developer and represents a measure of activity, and the temperature of the developer solution. Lower temperatures and higher development numbers correspond to longer required development times. However, photographers may deliberately vary film development time for a variety of reasons. Longer development produces negatives with higher contrast, or approximately normal contrast for film that has been "pushed" to an exposure index beyond its true ISO rating (i.e. underexposed). Conversely, "pulled" film which has been exposed at a lower-than-normal exposure index requires shorter processing time.

Because developer temperature also affects the rate of development, photographers often vary temperature to control grain size, to produce artistic "defects" in film appearance through reticulation, or simply to alter processing time for convenience. On the other hand, temperature is sometimes a factor beyond the photographer's direct control. Development time must then be adjusted as a response.

The invention calculates the normal film processing time for a given developer at a given temperature. In addition, the user can bias the results toward any desired degree of enhanced or decreased development, expressed in percentage terms.

Production of a finished print tends to involve more sujective judgments than those governing film development. Because there is no single ideal appearance for a photographic print, obtaining the proper exposure time for a particular enlargement inevitably requires a trial and error procedure. However, photographers often modify the enlargement magnification after obtaining an acceptable print in order to emphasize a smaller or larger portion of the image; any change in the height of the enlarger head results in alteration of the intensity of light reaching the sensitized substrate, and necessitates a corresponding adjustment in exposure. The addition of filters between the enlarger lens and sensitized substrate likewise requires exposure compensation.

It is possible to calculate the precise amount of additional or reduced exposure necessary to accomodate a change in enlarger height if the change in magnification produced thereby is known. Because this quantity is difficult to ascertain directly, photographers usually resort to making comparison measurements between similar image segments before and after the change in enlarger height. Similarly, the increase in exposure time necessary to accomodate a black-and-white contrast filter or color filter pack may be calculated directly if the characteristics of the filter(s) are known. The invention dispenses with manual procedures by measuring directly the light emitted onto the sensitized substrate before and after the exposure-altering event. The comparative readings are converted into a digital ratio, and applied to a user-entered lens aperture value or exposure time to yield an adjusted aperture or time. Adjustment of aperture helps avoid color shifts that may result from overly short or long exposure times, while adjustment of time can preserve the image sharpness produced by a small aperture.

Even at a constant enlarger height, several interrelated quantities may be varied by the photographer; proper adjustment to the remaining variables permits overall exposure to remain unchanged. These variables include the duration of enlarger exposure, the aperture of the enlarger lens and the sensitivity of the sensitized substrate. For black-and-white printing papers, sensitivity is expressed in units of paper speed, with higher numbers corresponding to greater sensitivity and concomitantly lower exposures necessary for proper image rendition. For color printing paper, sensitivity is expressed as an exposure factor, with lower numbers corresponding to greater sensitivity. Where an initial set of exposure variables has been selected, the invention permits variation of one or more of these variables to obtain the corresponding change in one of the remaining variables necessary to bring exposure back to normal.

The invention also includes timer and temperature measurement functions of use to darkroom photographers. A "stop-watch" function measures elapsed time, permitting the photographer to monitor and compare development progress and other reactive processes; and a count-down timer permits entry of a desired time period (e.g. pre-set development or exposure time), with the display indicating the unelapsed portion of the pre-set time. Three temperature probes are provided, which the user may immerse in chemical solutions or leave exposed to the atmosphere. The user can display the temperature detected by any of the three probes individually, and may then perform calculations involving temperature as if the displayed number had been manually entered.

The basic computational architecture of the present invention consists of a bank of read-only memory (ROM); random-access memory (RAM); a series of registers organized in three groups which are conveniently thought of as stacked levels; and a series of status flags that indicate whether particular keys have been pressed (two flags are allocated to the [PER] key). Status flags may also be used to indicate whether corresponding registers are empty or contain data. As used herein, registers are small portions of dedicated RAM used to store data that are manually inputted by the user or generated internally; status flags are one-bit registers which can indicate one of two states.

The lowest ($R_0$) level consists of a scratchpad register (accumulator, or Acc), a secondary scratchpad register for conversion operations (Ind) and a display register (DSPLY). The contents of the latter register are continuously displayed on the unit's output means, which in the preferred embodiment is a multi-digit red light-emitting diode (LED) display. The second ($R_1$) level contains registers for all variables that the invention is designed to calculate or use in the performance of calculations. Separate registers are desirable because all such variables are interrelated, and the user should be afforded the opportunity to decide which are to be independent (i.e. manually entered) and which are to be computed therefrom. The next ($R_2$) level includes registers that hold manually entered data relating only to those variables subject to variation within a particular calculation (as when, for example, the value of one variable is changed to determine the effect on another variable). These are referred to as "changing variables."

A block of ROM contains conversion factors for mass/weight, volume and concentration conversions. The values stored therein are called as needed to perform conversion operations.

The invention also comprises temperature sensing and light sensing means, the analog output of which are converted by the invention into digital values. The invention can accomodate up to three temperature sensing probes. The user causes the Fahrenheit temperature associated with any of these to be entered into DSPLY by pressing the corresponding temperature key, thereby actuating visual display as well as possible incorporation of the displayed value into various relevant calculations.

B. Detailed Description of the Invention

Mass/weight, volume and concentration conversions are performed by means of permanently stored arrays of conversion values that are applied as needed to the user's entered data, separate arrays being maintained for the mass/weight, volume and concentration conversion factors. These arrays are actually multidimensional configurations that have been collapsed into a single dimension for storage purposes. Each mass/weight and volume key corresponds to a value stored in ROM that is used to specify the location of the appropriate conversion factor (referred to as "wt" and "vol" values), which are also stored in ROM. For conversions between mass/weights or between volumes, pressing of the unit key after entry of a numerical quantity is interpreted by the invention's microprogramming as a signal to retrieve the wt or vol value from ROM, enter it into the accumulator, decrease the value by one and then multiply it by one of two pre-set constants, this constant being equal to five in the case of mass/weight units and to seven in the case of volume units. This operation produces a "field value," which denotes a rough approximation of the conversion factor's location in memory.

Were the array configured as a two-dimensional table of conversion factors, with row and column labels corresponding to the conversion units, the field value might represent a row. The user then presses the key corresponding to the desired unit. Because this unit key has been pressed following a previous unit key rather than a numerical key, the invention's microprogramming interprets this action as a signal once again to retrieve the appropriate wt or vol value but this time to add it to the field value residing in the accumulator. The resulting numerical quantity specifies the position within the array of the conversion factor. Were the array configured as a two-dimensional table, the second wt or vol value (denoted the "label value") would specify the appropriate column. However, the position within the array is not equivalent to the memory address, because memory blocks have been clustered to preserve space. A third number, called the "address factor" (AF), must be added to the accumulator to specify the location within the ROM block where the array is stored. The precise value for AF represents a design choice, but three unique values (one for mass/weight calculations, one for volume calculations and one for concentration calculations) must be assigned. Upon calculation of the ROM address where the conversion factor is located, the invention's control means fetches the conversion factor and enters it into the accumulator (replacing the address value). The conversion factor thus stored in the accumulator is multiplied by the user's original number still contained in DSPLY to produce the desired result, which is then transferred to DSPLY.

The above discussion of access to the mass/weight conversion factors can be summarized by the following formula:

$$\text{location (mass/weight)} = [(wt - 1) \times 5] + wt' + AF$$

where wt and wt' are the pre-set values of the known and unknown weight units. These values are as follows:
lb = 1
oz = 2
Gr = 3
g = 4
kg = 5

Thus, if the user wishes to convert 250 grains to grams, the following keys would be pressed with the results indicated alongside:

| | | |
|---|---|---|
| [2][5][0] | → | DSPLY = 250<br>numerical data entered after last function performed causes all registers and flags to be cleared |
| [Gr] | → | wt value (3) fetched from ROM, transferred to Acc<br>Acc = (Acc − 1) × 5 = 10 |
| [g] | → | A sequence of two successive variable keys signals that all data have been entered and computation may be performed. Computation relating to the [g] key is as follows:<br>Acc = Acc + wt' key value (i.e. 4) + AF<br>= 14 + AF<br>value in memory address specified by Acc (the conversion factor, i.e. .0648 g/Gr) retrieved and transferred to Acc<br>Acc = Acc × DSPLY = 16.2<br>Acc → DSPLY (16.2 displayed to user) |

Similarly, the accessing formula for the volume conversion array is:

$$\text{location (volume)} = [(\text{vol} - 1) \times 7] + \text{vol}' + AF.$$

Computations are performed in a manner similar to those relating to mass/weight conversions. The pre-set vol values are as follows:
gal = 1
qt = 2
fl. oz = 3
ml = 4
l = 5
tsp = 6
tbp = 7

Concentration conversion factors are located in a four-dimensional array which has also been collapsed into a single dimension for ease of storage. Access to the array is gained by means of the pre-set values for mass/weight and volume units, but teaspoon and tablespoon volume units are unavailable. The five mass/weight units and five volume units that are available for concentration calculations result in 625 possible conversion factors; however, as detailed in the Summary of the Invention, not all mass/weight-volume permutations are available. Because the structure of the array has been preserved, these omissions result in memory gaps. Many of the gaps may be filled with the mass/weight and volume conversion factors.

Concentrations are expressed as a mass/weight unit followed by pressing [PER] followed by a volume unit. The accessing formula for concentration is:

$$\text{location (volume)} = ([[(wt - 1) \times 5) + \cdot (\text{vol} - 1)] \times 25) + [([wt' - 1] \times 5) - \text{vol}']$$

Hence, the user first enters the numeric value for concentration, then presses the mass/weight key corresponding to the appropriate unit, followed by the [PER] key, and ending with the volume key corresponding to the appropriate volume unit. Immediately after performing this input sequence, the user presses the desired mass/weight key, [PER] key and volume key, which results in the converted concentration value appearing on the display.

The internal operations resulting in proper output are as follows:

| | | |
|---|---|---|
| [numerical entry] | → | DSPLY contains input<br>numerical data entered after last function performed causes all registers and flags to be cleared |
| [mass/weight key] | → | wt value fetched from ROM, transferred to Acc |
| [PER] | → | PER$_1$ flag set to 1 |
| [volume key] | → | test values of PER$_1$ and PER$_2$ flags:<br>since PER$_1$ = 1 and PER$_2$ = 0,<br>vol value fetched from ROM, transferred to Acc<br>Acc = Acc + vol − 1<br>Acc = Acc + 25<br>Acc → Ind |
| [desired weight key] | → | wt value fetched from ROM, transferred to Acc |
| [PER] | → | since PER$_1$ flag = 1, PER$_2$ flag set to 1 |
| [volume key] | → | test values of PER$_1$ and PER$_2$ flags:<br>vol value fetched from ROM, transferred to Acc<br>since PER = 1 and PER = 1,<br>Acc = Acc − vol<br>Acc = Acc + Ind<br>Acc → Ind<br>Acc = value contained in address specified by Ind<br>Acc = Acc × DSPLY<br>Acc → DSPLY |

The invention performs temperature conversions on values entered into the $R_1(°C.)$ or $R_1(°F.)$ registers, either as output from earlier calculations, from one of the temperature monitoring probes or by the user entering a numerical value followed by the [°C.] or [°F.] key. The conversion function is performed when the user presses the [°C.] or [°F.] key following either entry of the value to be converted into $R_1(°C.)$ or $R_1(°F.)$ or after completion of the previous calculation giving rise to the temperature value. The microprogramming interprets this condition as a request to perform conversion on the contents of the $R_1(°C.)$ or $R_1(°F.)$ register corresponding to the unpressed temperature key or uncalculated temperature value. Thus, where the [°C.] key has been pressed, the contents of $R_1(°F.)$ are transferred to the accumulator and the following equation is executed:

$$Acc = (Acc - 32) = 0.5555$$

The value in the accumulator is then transferred to DSPLY.

Where the [°F.] key has been pressed, the contents of $R_1(°C.)$ are transferred to the accumulator and the following equation is executed and similarly displayed:

$$Acc = (Acc \times 1.8) + 32$$

It has been found that the relationship between development number (D#), temperature (°C. or °F.) and development time can be adequately described by the following equations:

$$\text{time} = 1.319 \times 2^{(0.1306(D\#) - 0.1176(°C.))} \qquad \text{Eq. 1}$$

$$\text{time} = 5.162 \times 2^{(0.1306(D\# - °F./2))} \qquad \text{Eq. 2}$$

The user may obtain a normal development time or one biased toward under- or overdevelopment by entering values for D#, Fahrenheit or Celsius temperature, and the desired percentage of under- or overdevelopment, following each quantity with the [D#], [°F.] or [°C.], and [Δ%] keys, respectively. Order of entry is not critical, so long as the proper unit key is pressed after the entered quantity. This operation enters the user's values into the appropriate $R_1$ level registers. Failure to enter a quantity for Δ% results in the $R_1(\%)$ register being set to 1. Following entry of the last input quantity, the user presses the [t] key, which signals execution of Eq. 1 or 2; the proper equation is chosen by reference to $R_1(°C.)$ (or an associated flag), a non-zero value indicating Eq. 1 and a zero value indicating Eq. 2.

The results of Eq. 1 or 2 are stored in Acc, and the result multiplied by the contents of $R_1(\%)$. The mantissa of this result is multiplied by 60 and reinserted to provide min.sec format, with this adjusted result being transferred to DSPLY.

The invention also calculates the water temperature necessary to dilute an initial volume of liquid (e.g. a room-temperature stock solution) to arrive at a desired temperature for a working solution, using the following keystroke procedure:

sure-altering event is then performed with the unit still in place, folloWed by pressing the [NEW EXP] key. Pressing of the [NEW EXP] key causes actuation of the photocell circuit and conversion of the analog reading into a digital value, with the result this time being divided into the contents of the accumulator, and subsequent performance the following sequence of operations:

---

If f flag = 1,
Acc = $R_1(f) \times 2^{-(log2(Acc))/2}$
Perform ADJUST OUT routine (discussed below)
Acc → DSPLY
If f flag = 0,
Acc = $R_1(t) \times$ Acc
Perform ADJUST OUT routine
Acc → DSPLY

---

When the user has manually obtained an acceptable exposure for a particular print, the user can vary the values of one or two of (1) duration of enlarger exposure, (2) aperture of the enlarger lens and (3) sensitivity It must be noted that, throughout the invention, register-related flags may be omitted in favor of testing the contents of the relevant registers for zero or non-zero value.

To obtain an adjusted aperture or exposure time value necessary to accomodate a change in exposure (e.g. due to a change in enlarger height, lens or the addition of a filter), the user first enters a value for time or aperture, then presses either the [t] or [f] key, respectively. If the [f] key is pressed, the ADJUST IN routine, discussed below, is performed. The user then places the unit under the enlarger so that the photocell is positioned at the center of the image, and presses the [OLD EXP] key. This causes actuation of the photocell circuit, conversion of the analog reading into a digital value, and storage of the digital value in Acc. The expoof the sensitized substrate; the invention will inform the user of the adjustment to the chosen dependent variable that will be necessary to bring exposure back to normal, given the changes made by the user in the other independent variable or variables. This output is termed the "exposure compensation result."

The user enters values for all known variables, which are stored in the appropriate $R_1$ registers upon input. Entry is accomplished by pressing keys representing the desired numerical data followed by pressing the key corresponding to the desired variable. When all known initial values have been entered, the user presses a key so indicating (denoted as the [SET] key); this key causes values in the $R_1$ registers to be copied into the corresponding registers in the $R_2$ level, with subsequent reset of the $R_1$ registers to zero. The user then enters values for all known changing variables, and concludes by pressing the key corresponding to the unknown changing variable. A sequence of two successive variable keys signals that all data have been entered and computation may be performed. Following the calculations described below, this value is displayed.

The first task performed by the invention after the user has chosen the unknown changing variable is to renormalize values of the exposure variables so that changes thereto may be related to one another in terms of their relative impact on overall exposure. In the present invention these normalized values are termed "exposure equivalents," or "EEs". EEs are linear scaling factors that relate one set of exposure values to another. For example, with all other exposure variables remaining constant, an exposure duration of 2.5 sec as compared to 10 sec represents an EE of 4; that is, the latter duration will provide four times the exposure of the former.

While changes in exposure duration and sensitivity produce linear effects on exposure, the relationship between aperture and exposure is geometric. EEs for paper speed (Spd) and exposure duration (t) are obtained by dividing $R_1$ (final) values by $R_2$ (initial) values for known variables; EEs for paper exposure factor (EF) and aperture (f) are obtained by dividing $R_2$ values by $R_1$ values for known variables; in the case of aperture this quotient is squared.

Variables for which the user has not entered at least one value are ignored. After calculating EE values, the invention proceeds to multiply all EEs by one another. The product, P(EE), represents the degree to which proper exposure has been altered by the user's adjustments (as represented by final $R_1$ values), and may be used to determine the change in the dependent variable (i.e. the one for which an $R_2$ value exists but a final $R_1$ value does not) necessary to restore proper exposure.

The invention then applies P(EE) to the unknown changing variable to arrive at the necessary adjustment. For EF, which is inversely and linearly related to exposure, the $R_2$ value may simply be multiplied by P(EE) to yield the required adjustment. Because Spd and t are directly and linearly related to exposure, the $R_2$ value must be divided by P(EE). For aperture, the $R_2$ value must be multiplied by $2^{(log_2(P(EE)))/2}$.

Where exposure duration or aperture is the unknown changing variable, ADJUST OUT is performed. The exposure compensation result is then transferred to DSPLY.

As a simple example, the user might wish to decrease the enlarger lens aperture from f/8 to f/4. If the initial exposure duration is 10 sec, the user would perform the following keystrokes:

| | | |
|---|---|---|
| [1][0][t] | → | $R_1(t) = 10$ |
| [8][f] | → | $R_1(f) = 8$ |
| [SET] | → | $R_2(t) = 10$ |
| | | $R_2(f) = 8$ |
| | | $R_1(t) = 0$ |
| | | $R_1(f) = 0$ |
| [4][f] | → | $R_1(f) = 4$ |
| [t] | → | $EE(f) = 4$ |
| | | $P(EE) = 4$ |
| | → | exposure compensation result $= 4 \times 10$ |
| | | $= 40$ |

The invention permits entry of fractional values, and presents output in the format most convenient to users of photographic equipment. Aperture settings are represented in f-stops, and many enlarger lenses allow up to three intermediate settings (¼, ½, ¾) between stops. The invention contains keys that permit such intermediate settings to be appended to the primary f-stop. However, f-stops are not linearly related to one another, so the actual f-stop value cannot be calculated by simple interpolation. Instead, an intermediate aperture value is related to its primary value by the equation $$f_{adjusted} = f \times 2^{(fractional\ value)/2} \qquad \text{Eq. 3}$$

where f is the base f-stop value. The result of Eq. 3 may be calculated or, owing to the limited number of possible aperture settings, looked up from a table containing values corresponding to all base and intermediate aperture settings. This is the task performed by the routine called ADJUST IN.

ADJUST IN operates on data in DSPLY, which is first transferred to the accumulator. After the ADJUST IN computations are performed, the modified value in the accumulator is transferred to the appropriate $R_1$ register.

Raw exposure or aperture obtained from calculations must likewise be translated into usable settings before being displayed. This function is performed by the ADJUST OUT routine.

The tabular form of representing aperture data becomes particularly useful for translating raw results into standard lens settings. ADJUST OUT simply searches the table for the value closest to the raw aperture result, and transfers the corresponding aperture setting to the accumulator.

Exposure durations are rounded off to the nearest 0.1 sec for times less than or equal to 1 sec; to the nearest 0.5 sec for times less than 20 sec; and to the nearest 1 sec for times equal to or greater than 20 sec. For times greater than 60 sec, the output is converted to min.sec format.

D. Detailed Description of the Preferred Embodiment

Figure 1:
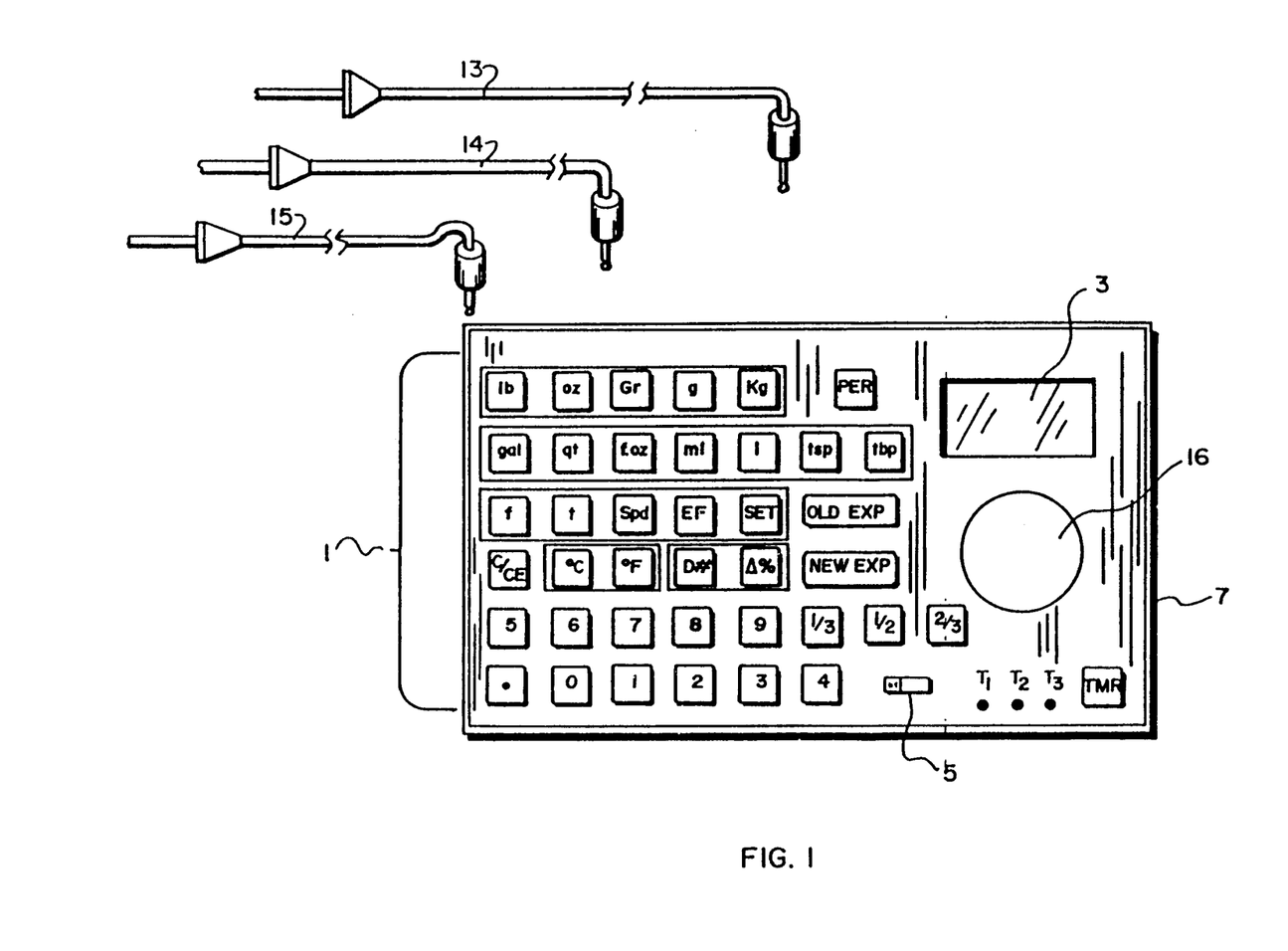
FIG. 1 is a top plan view of the preferred embodiment of this invention.
Figure 2:
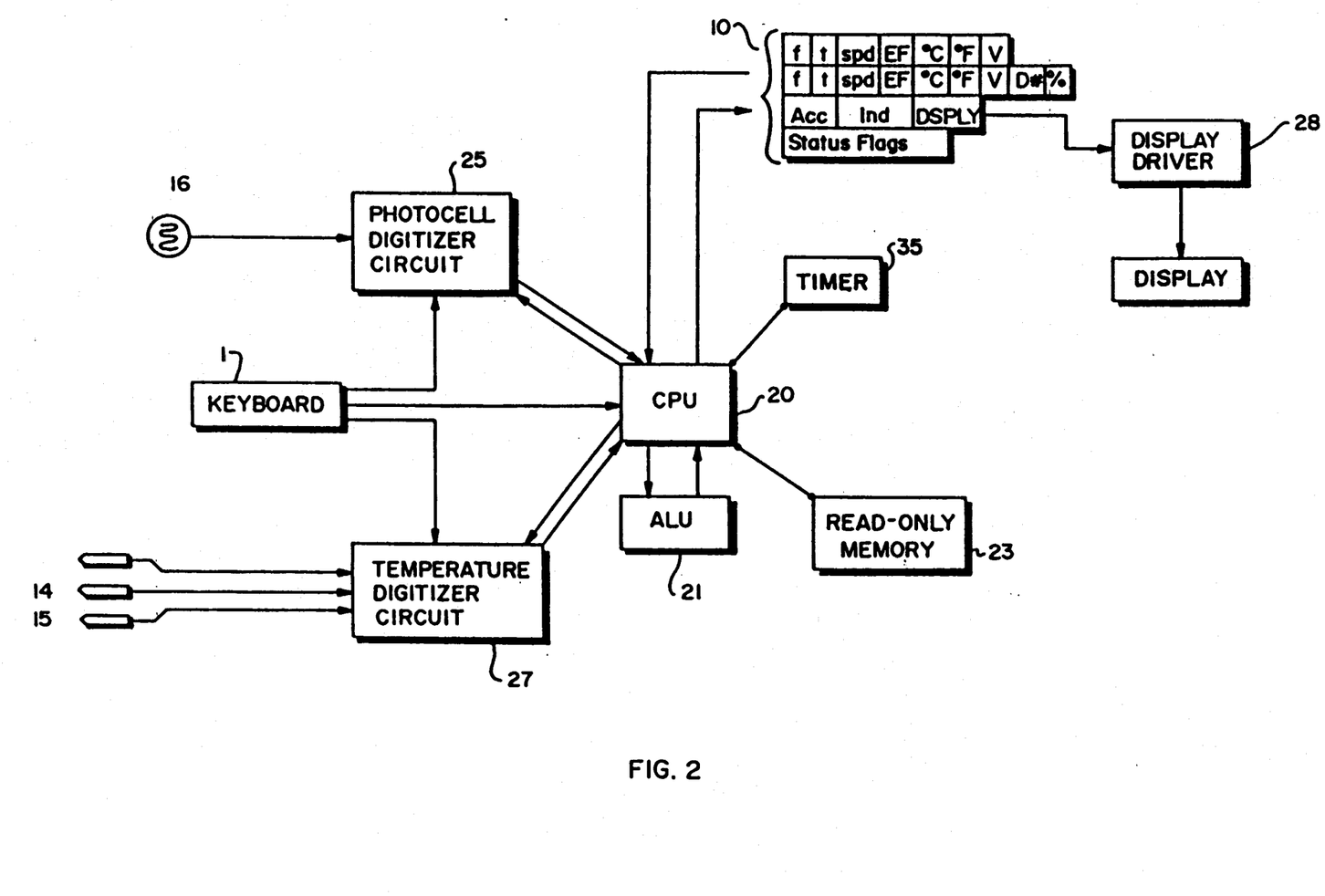
FIG. 2 is a schematic diagram of the embodiment shown in FIG. 1.

FIGS. 1 and 2 illustrate the preferred embodiment of this invention. FIG. 1 depicts the keys and display as visible to the user; FIG. 2 illustrates the internal organization.

Referring first to FIG. 1, it will be seen that keys are grouped according to function, so that related keys are located proximate to one another. The lower portion of keyboard 1 contains numeral pushbuttons 0 through 9, as well as fractional values. Pressing the C/CE key once clears the DSPLY register without disturbing the contents of any other register or flag; pressing it a second time clears all registers and status flags in register bank 10 (depicted in FIG. 2). The switches labeled $T_1$, $T_2$ and $T_3$ correspond to the three external temperature probes 13, 14 and 15. Pressing any of these switches signals the microprocessor to admit the digital value representative of the temperature into DSPLY.

The unit has a housing 7 which has on its lower surface a removable cover that overlays a cavity for batteries. An on/off switch 5 is positioned at the bottom of the housing. Output is preferably displayed on a red LED display 3 to permit safe use in a darkroom where only black-and-white processing takes place, although a liquid crystal display (LCD) could be employed instead to conserve power. Keyboard 1 may also comprise translucent keys and be red-illuminated from the rear; while this feature would enhance visibility in a black-and-white darkroom, cost and power consumption would rise significantly. On the top side of housing 7 are three standard receptacles into which fit the plug connectors on temperature probes 13, 14 and 15.

Photocell 16 is a silicon photocell or other suitable device, the electrical characteristics of which are altered in a predictable fashion upon exposure to light. Temperature probes 13, 14 and 15 contain thermistor or other suitable temperature-sensitive electrical components at their active ends, and standard plug connectors that are selectively introduced by the user into housing 7. The user must be able to monitor atmospheric or liquid temperature, so it is necessary that the temperature probes be waterproof and capable of withstanding the effect of darkroom chemicals.

Contained within housing 7 and configured in a manner conventional for such circuitry are electronic elements including a control circuit which performs the functions associated with the invention. As will be understood by those skilled in the art, the control circuit of this invention may be implemented in any of a number of different ways. However, as with many prior art electronic circuits, the preferred embodiment of the invention utilizes an integrated circuit microprocessor.

A more detailed view of the control circuit is provided in FIG. 2. The microprocessor, which may be chosen from the wide variety presently available from a number of manufacturers, consists of a central processing unit (CPU) 20 and an arithmetic logic unit (ALU) 21. The CPU accepts input from keyboard 1, photocell digitizer circuit 25 and temperature digitizer circuit 27; interacts with memory; and supervises the flow of data. The ALU, which consists of discrete logic components often physically integrated within the CPU, performs the basic data operations necessary to mathematic calculation. A bank of read-only memory (ROM) 23 contains the programming that directs the CPU to interpret keystrokes, perform operations on data and shift data among registers in a manner consistent with the present invention as heretofore described, as well as the conversion arrays, wt and vol key values, and aperture values for the ADJUST IN and ADJUST OUT routines. It is the ROM which permits use of a general-purpose microprocessor to accomplish the specific tasks performed by the invention.

Register bank 10, which may be located within the microprocessor or in an external array, contains dedicated storage registers and status flags. These registers correspond to the variables that may be entered via keyboard 1, and also include the accumulator, DSPLY, and an additional scratchpad register (Ind) that facilitates conversion operations. A status flag is assigned to each of the $R_1$- and $R_2$-level registers, and indicates whether data has been stored therein. In addition, one status flag is assigned to the [SET] key to indicate whether that key has been pressed, and two such flags are assigned to the [PER] key to indicate whether that key has been pressed once or twice. The contents of DSPLY are constantly fed through display driver circuit 28 to LED display 3 and displayed thereon.

The photodetect circuit, which supplies CPU 20 with an input signal representative of ambient light impinging on photocell 16, includes the photocell 16 and a photocell digitizer circuit 25. Photocell 16 generates an electrical signal or alters its electrical characteristics in a manner related to the light impinging thereon. This signal is supplied to photocell digitizer circuit 25. Photocell digitizer circuit 25 converts the signal from photocell 16 into an output signal usable by CPU 20 in response to a trigger signal produced by the [OLD EXP] and [NEW EXP] keys. Because two such digital quantities will be utilized together as a ratio, their absolute numerical values are unimportant; precision, not accuracy, is required. Photocell circuits are well-known in the art, and are found in a wide array of commercial products. Digital output is found in some photographic lightmeter apparatus, but any analog-to-digital conversion scheme will suffice.

The temperature measurement circuit, which supplies CPU 20 with an input signal representative of the temperature of the material surrounding the selected probe, includes temperature probes 13, 14 and 15 and a temperature digitizer circuit 27. Temperature probes 13, 14 and 15 generate an electrical signal or alter their electrical characteristics in a manner related to the temperature of material with which they come in contact. Upon the user's pressing any one of the switches labeled $T_1$, $T_2$ or $T_3$, a trigger signal is provided to temperature digitizer circuit 27, which in response converts the signal from one of temperature probes 13, 14 or 15 into a digital quantity. The digital output thereof is transferred to CPU 20 and then to DSPLY and $R_1(^\circ F.)$, which are located in register bank 10. The trigger signal is repeated by CPU 20 at frequent pre-set intervals to update the temperature measurement. Temperature measurement devices are well-known in the art. However, for color photography applications it is critical that the temperature measurement circuit have an accuracy of better than $\pm 0.1^\circ 0$ F.

Timer circuit 35 is shown as a separate component in FIG. 2, but derives its basic timing source from the clock drive of CPU 20. Depending on the particular microprocessor utilized, additional external circuitry may be necessary to convert clock cycles into units based on seconds. Timer circuitry is conventional and well-known to practitioners in the art. When the user presses the [TMR] key, pulses from timer circuit 35 are transmitted to or within CPU 20. If no value has been entered into DSPLY, successive integers beginning with zero are transferred to DSPLY and incremented each second. If DSPLY contains a non-zero value, that value is decremented by one each second.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An apparatus for calculating and displaying adjusted values of at least one photographic parameter relating to darkroom photography, said apparatus comprising:

a. input means for entering values corresponding to at least two of the parameters exposure duration, lens aperture, paper speed and exposure factor, and a second set of values of at least one of the parameters exposure duration, lens aperture, paper speed and exposure factor, said second set of values comprising one fewer element than said first set;

b. processor means responsive to said input means adapted for receiving signals representative of said first and second sets of values and normalizing the differences to compute the adjusted value of the photographic parameter for which a value was entered in said first set of values but not in said second set, said adjusted value reflecting the value of said photographic parameter necessary to restore the exposure inherent in the values of said second set of parameters to that inherent in the values of said first set of parameters; and c. display means for presenting the adjusted value.

2. The apparatus of claim 1 further suitable for calculating proper development time from a development number and development temperature, such that said input means is further suitable for entering values corresponding to the development number and the development temperature and said processor means is further adapted for receiving signals representative of said values and calculating therefrom the proper development time.

3. The apparatus of claim 1 further comprising:
a. Temperature sensing means;
b. Temperature digitizing means for converting the response of said temperature sensing means into a digital value;
c. Display means for presenting said value.

4. The apparatus of claim 1 further comprising timer means for displaying elapsed or unexpired time.

5. The apparatus of claim 1 further suitable for calculating the temperature of a diluent necessary to achieve a target solution temperature, such that said input means is further suitable for entering values corresponding to the diluent volume, the ultimate total mixed volume, the temperature of the undiluted liquid and the desired temperature of the ultimate solution and said processor means is further adapted for receiving signals representative of said values and calculating therefrom the temperature of the diluent necessary to achieve the desired temperature of the ultimate solution.

6. The apparatus of claim 5 further comprising:
a. Temperature sensing means;
b. Temperature digitizing means for converting the response of said temperature sensing means into a digital value; and
c. Display means for presenting said value.

7. The apparatus of claim 5 further comprising timer means for displaying elapsed or unexpired time.

8. The apparatus of claim 5 further suitable for calculating proper development time from a development number and development temperature, such that said input means is further suitable for entering values corresponding to the development number and the development temperature and said processor means is further adapted for receiving signals representative of said values and calculating therefrom the proper development time.

9. The apparatus of claim 8 further comprising:
a. Temperature sensing means;
b. Temperature digitizing means for converting the response of said temperature sensing means into a digital value; and
c. Display means for presenting said value.

10. The apparatus of claim 9 further comprising timer means for displaying elapsed or unexpired time.

11. An apparatus for converting a mass, weight, volume or concentration quantity expressed in a first unit into an identical quantity expressed in an alternative unit, said apparatus comprising:

a. Input means for entering a first value and specifying the unit relating thereto and thereupon entering a second unit;

b. Permanent memory means for storing an array of unique values representing conversion factors which, when multiplied by a value corresponding to a quantity expressed in one unit will yield a value corresponding to the same quantity expressed in another unit;

c. Processor means responsive to said input means and adapted for selectively retrieving from said array the conversion factor necessary to convert said first value into an identical quantity expressed in said second unit and multiplying said conversion factor by said first value to obtain a converted value; and d. Display means for presenting the converted value.

12. The apparatus of claim 11 further suitable for calculating the temperature of a diluent necessary to achieve a target solution temperature, such that said input means is further suitable for entering values corresponding to the diluent volume, the ultimate total mixed volume, the temperature of the undiluted liquid and the desired temperature of the ultimate solution and said processor means is further adapted for receiving signals representative of said values and calculating therefrom the temperature of the diluent necessary to achieve the desired temperature of the ultimate solution.

13. The apparatus of claim 11 further suitable for calculating proper development time from a development number and development temperature, such that said input means is further suitable for entering values corresponding to the development number and the development temperature and said processor means is further adapted for receiving signals representative of said values and calculating therefrom the proper development time.

14. The apparatus of claim 11 further comprising:
a. Temperature sensing means;
b. Temperature digitizing means for converting the response of said temperature sensing means into a digital value; and
c. Display means for presenting said value.

15. The apparatus of claim 11 further comprising timer means for displaying elapsed or unexpired time.

16. An apparatus for computing the adjustment to exposure of a light-sensitive substrate necessary to restore a previous level of exposure which has been varied, said apparatus comprising:

a. input means for entering a value corresponding to one of the parameters initial exposure time and lens aperture;

b. photodetect means for measuring the intensity of light emitted by the exposure source and converting the measurement into a digital value;

c. processor means responsive to said input means and said photodetect means, and adapted for:

(1) receiving signals from said photodetect means representative of a first digital value representing the intensity of light at an initial exposure condition and a second digital value representing the intensity of light at a different exposure condition;

(2) dividing said first digital value by said second digital value; and (3) multiplying the quotient thus obtained by said entered value corresponding to one of the parameters initial exposure time and lens aperture; and d. display means for presenting the adjusted exposure time or lens aperture.

17. The apparatus of claim 16 further suitable for calculating the temperature of a diluent necessary to achieve a target solution temperature, such that said input means is further suitable for entering values corresponding to the diluent volume, the ultimate total mixed volume, the temperature of the undiluted liquid and the desired temperature of the ultimate solution and said processor means is further adapted for receiving signals representative of said values and calculating therefrom the temperature of the diluent necessary to achieve the desired temperature of the ultimate solution.

18. The apparatus of claim 16 further suitable for calculating proper development time from a development number and development temperature, such that said input means is further suitable for entering values corresponding to the development number and the development temperature and said processor means is further adapted for receiving signals representative of said values and calculating therefrom the proper development time.

19. The apparatus of claim 16 further comprising timer means for displaying elapsed or unexpired time.

* * * * *